United States Patent
Rusek et al.

(10) Patent No.: US 9,485,002 B2
(45) Date of Patent: Nov. 1, 2016

(54) EQUALIZING METHOD IN A RECEIVER NODE OF A WIRELESS COMMUNICATION SYSTEM

(71) Applicant: HUAWEI TECHNOLOGIES CO., LTD., Shenzhen (CN)

(72) Inventors: Fredrik Rusek, Lund (SE); Basuki Endah Priyanto, Lund (SE); Sha Hu, Lund (SE); Gengshi Wu, Lund (SE); Shashi Kant, Lund (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 14/068,607

(22) Filed: Oct. 31, 2013

(65) Prior Publication Data

US 2015/0117391 A1    Apr. 30, 2015

(51) Int. Cl.
| | |
|---|---|
| H04L 25/03 | (2006.01) |
| H04B 7/08 | (2006.01) |
| H04L 27/26 | (2006.01) |
| H04W 28/04 | (2009.01) |
| H04B 7/04 | (2006.01) |

(52) U.S. Cl.
CPC .......... *H04B 7/0837* (2013.01); *H04B 7/0413* (2013.01); *H04L 25/0328* (2013.01); *H04L 25/03171* (2013.01); *H04L 25/03968* (2013.01); *H04L 27/2691* (2013.01); *H04W 28/048* (2013.01); *H04L 25/03821* (2013.01)

(58) Field of Classification Search
CPC .. H04B 7/0413; H04B 7/0452; H04B 1/711; H04L 25/0202; H04L 27/2691; H04L 25/0328; H04L 25/03821; H04W 25/048
See application file for complete search history.

(56) References Cited

U.S. PATENT DOCUMENTS

| | | | |
|---|---|---|---|
| 8,576,742 B2 | 11/2013 | Yoo et al. | |
| 2007/0041475 A1* | 2/2007 | Koshy et al. | 375/340 |
| 2010/0248666 A1* | 9/2010 | Hui et al. | 455/208 |

(Continued)

FOREIGN PATENT DOCUMENTS

| | | |
|---|---|---|
| CN | 103004117 A | 3/2013 |
| CN | 103326971 A | 9/2013 |

OTHER PUBLICATIONS

Extended European Search Report dated Mar. 7, 2014 in corresponding European Patent Application No. 13191029.1.

(Continued)

*Primary Examiner* — Andrew Chriss
*Assistant Examiner* — Salvador E Rivas
(74) *Attorney, Agent, or Firm* — Staas & Halsey LLP

(57) ABSTRACT

The present invention relates to an equalizing method in a receiver node of a cellular wireless communication system, the method comprising: receiving at least one radio signal comprising a plurality of resource elements; obtaining interference information associated with the plurality of resource elements; extracting resource elements from the plurality of resource elements carrying data into a first set based on the interference information; dividing the resource elements in the first set into one or more sub-sets each comprising T number of resource elements; filtering the resource elements in said one or more sub-sets by applying a balanced whitening and energy focusing filter W so as to obtain filtered resource elements y; and equalizing the filtered resource elements y. The invention also relates to a receive device, a computer program, and a computer program product.

16 Claims, 7 Drawing Sheets

(56) References Cited

U.S. PATENT DOCUMENTS

| | | | |
|---|---|---|---|
| 2011/0007851 A1* | 1/2011 | Li | 375/340 |
| 2012/0263247 A1* | 10/2012 | Bhattad et al. | 375/260 |
| 2014/0160949 A1* | 6/2014 | Clausen et al. | 370/252 |
| 2015/0311993 A1 | 10/2015 | Yoo et al. | |

OTHER PUBLICATIONS

"UE behavior for CRS interference mitigation", Qualcomm Incorporated, 6.9, 3GPP TSG-RAN WG4 #66bis, Apr. 2013, Chicago, IL, USA, 10pp.

"Further discussion on FeICIC demodulation and CSI test framework", Huawei, HiSilicon, 6.10.2.2, 3GPP TSG-RAN WG4 #66, St Julian's, Malta, Jan.-Feb. 2013, 6pp.

"MMSE-Prewhitened-MLD Equalizer for MIMO DFT-Precoded-OFDMA", Kuchi, IEEE Wireless Communications Letters, vol. 1, No. 4, Aug. 2012, pp. 328-331.

"ML receivers for NAICS", Qualcomm Incorporated, 9.7.2.3, 3GPP TSG-RAN WG4 #66bis, Apr. 2013, Chicago, IL, USA, 8pp.

"SUMIS: Near-Optimal Soft-In Soft-Out MIMO Detection With Low and Fixed Complexity", Čirkić et al, Communication Systems Division, Department of Electrical Engineering (ISY), Linköping University, Sweden, Jan. 2014, pp. 1-15.

"Optimal Channel Shortening for MIMO and ISI Channels", Rusek et al, IEEE Transactions on Wireless Communications, vol. 11, No. 2, Feb. 2012, pp. 810-818.

"A Survey on 3GPP Heterogeneous Networks", Damnjanovic et al, Qualcomm Inc., IEEE Wireless Communications, Jun. 2011, pp. 10-21.

"LTE-Advanced Modem Design: Challenges and Perspectives", Bai et al, Samsung Electronics, IEEE Communications Magazine, Feb. 2012, pp. 178-186.

"Robust UE Receiver with Interference Cancellation in LTE Advanced Heterogeneous Network", Priyanto et al, Lund Research and Design Center, Huawei Technologies Sweden AB, Sweden, 7pp.

"Advanced receiver signal processing techniques: evaluation and characterization", Artist4G, WP2, Henao et al, Version 1.00, 2011, pp. 1-125.

"$3^{rd}$ Generation Partnership Project; Technical Specification Group Radio Access Network; Evolved Universal Terrestrial Radio Access (E-UTRA); User Equipment (UE) radio transmission and reception (Release 11)", 3GPP TS 36.101 V11.0.0, Mar. 2012, 311pp.

Chinese Office Action dated May 17, 2016 in corresponding Chinese Patent Application No. 201410002998.9.

Chinese Search Report dated May 4, 2016 in corresponding Chinese Patent Application No. 201410002998.9.

* cited by examiner

EQUALIZING METHOD IN A RECEIVER NODE OF A WIRELESS COMMUNICATION SYSTEM

TECHNICAL FIELD

The present method relates to an equalizing method in a receiver node of a cellular wireless communication system. Furthermore, the invention also relates to a receive device, a computer program, and a computer program product thereof.

BACKGROUND OF THE INVENTION

Heterogeneous Network (HetNet) is a strategy introduced in LTE-A with the purpose of improving network capacity. In a HetNet depicted in FIG. 1 many pico-cells with low transmit power (~250 mW) overlay on a macro-cell with higher transmit power (1-40 W). The advantage of this layout is to perform off-loading macro-cell data traffic to smaller pico-cells and thus improving network capacity. Moreover, these cells are using the same frequency resources implying that a receiver node can suffer high interference from macro-cell(s) leading to performance degradation. Therefore, interference management is a crucial aspect in any HetNet.

LTE Release 10 has adopted enhanced-inter-cell interference coordination (e-ICIC) as part of the interference management. One key feature in e-ICIC is time domain interference management or also known as almost blank sub-frame (ABS) transmission. An ABS contains common reference symbols (CRS), broadcast channel (BCH), and synchronization signals (PSS/SSS). As shown in FIG. 1, while the UE in cell range expansion maintains data transmission to a pico-cell (serving cell), the macro cell (neighbor cell) transmits an ABS sub-frame. Depending on the cell-IDs, the CRS of the neighbor cell can be colliding with CRS of a serving cell (known as colliding CRS scenario) or it can be colliding with the data/control channels of the serving cell (known as non-colliding CRS scenario). Thus, in a non-colliding CRS scenario, the interference level of the control/data channel of the downlink serving cell is limited to the CRS from macro/neighbor cell(s). To combat the inter-cell interference at the receiver some prior art techniques have been proposed.

Successive interference cancellation (SIC) is a well-known technique within the CRS interference cancellation (CRS-IC) area. SIC performs interference cancellation from dominant interferences (often neighbor cells) successively. The typical operation at a receiver node, such as a UE, with CRS-SIC is as follows:

Estimating the channel frequency response (CFR) of the first dominant neighbor cell;

Creating a replica of the dominant interference by multiplying the locally generated CRS of neighbor cell with the estimated CFR;

Removing the dominant interference by subtract the received signal with the re-created/replica of the dominant interference;

Repeating the previous steps whenever there is a need to cancel the second or subsequent dominant interference; and Once the interference(s) have been removed, the receiver node continues to perform demodulation of desired signal from serving cell.

The SIC technique, however, has at least the following technical issues:

The interference cancellation is depending on the accuracy of the neighbor cell(s) channel estimation.

The error in the first cancellation is propagated to the subsequent cancellation and thus increasing the residual error. Hence, the error propagation leads to performance degradation.

Implementation complexity and latency are expected to be linearly increasing with the number of cell(s) to be cancelled.

Another prior art solution is so called log-likelihood ratio (LLR) muting at the receiver. LLR muting attenuates the set of LLRs corresponding to the interfered data symbols, or in some cases, even sets them to zero. This method requires only a negligible computational effort at the receiver, but yields only minor gains.

Yet another prior art solution is the robust equalizer (RBE). In the RBE, the interference from the neighbor cell(s) is treated as Gaussian noise with a known correlation matrix. The correlation matrix is known since it is assumed that it follows the same distribution as the serving cell channel. Thereafter the RBE performs minimum mean square error (MMSE) equalization where the correlation of the interference is appropriately treated.

The technical drawback of the RBE is that it is limited to the MMSE detection which is significantly worse in performance than near optimum detectors, such as maximum-likelihood (ML) detection.

SUMMARY OF THE INVENTION

An objective of the present invention is to provide a solution which mitigates or solves the drawbacks and problems of prior art solutions.

Another objective of the present invention is to provide a receiver method which provides improved performance compared to prior art solutions.

According to a first aspect of the invention, the above mentioned and other objectives are achieved by an equalizing method in a receiver node of a cellular wireless communication system, the cellular wireless communication system using time/frequency resource elements for transmission of radio signals over a Multiple Input Multiple Output, MIMO, radio channel, and the radio signals comprising different channels and/or pilot symbols; the method comprising the steps of:

a) receiving at least one radio signal comprising a plurality of resource elements;

b) obtaining interference information associated with the plurality of resource elements;

c) extracting resource elements from the plurality of resource elements carrying data into a first set based on the interference information so that the first set comprises resource elements carrying data and being affected by interference;

d) dividing the resource elements in the first set into one or more sub-sets each comprising T number of resource elements;

e) filtering the resource elements in said one or more sub-sets by applying a balanced whitening and energy focusing filter W so as to obtain filtered resource elements y; and f) equalizing the filtered resource elements y by applying at least one detector arranged to handle L MIMO layers.

According to an embodiment of the method, the interference information indicates time/frequency location of the resource elements of the first set.

According to another embodiment of the method, said receiving node is served by a serving cell, and the interference information comprises information about Almost Blank Sub-frame, ABS, transmissions from interfering cell(s).

According to yet another embodiment of the method, the sub-set size T is based on the channel conditions for the radio channel, is predetermined, or fixed. According to this embodiment the channel conditions are coherence bandwidth and coherence time for the radio channel. Further, according to this embodiment, the value for the sub-set size T is increased with increasing coherence bandwidth and coherence time, and vice versa.

According to yet another embodiment of the method, the filter W is dependent on L. According to this embodiment the filter W has the form: $W=(G^*)^{-1}(\Gamma+I)H^*(HH^*+R_{WW}-1$, where G is a PT×PT block diagonal virtual MIMO matrix, where each block along the diagonal has dimension L×L, $\Gamma$ equals $\Gamma=G^*G+I$, I is the identity matrix, H is the RT×PT channel matrix across all T resource elements, and $R_{WW}$ is the RT×RT covariance matrix of the interference across the T number of resource elements. R denotes the number of receive antennas while P denotes the number of transmit antennas. Further, according to this embodiment $(HH^*+R_{WW})^{-1}=U[\Lambda\oplus\Phi]^{-1}U^*$, where U is the left unitary matrix of the singular value decomposition of $HH^*$, $\Lambda$ is the eigenvalues of the average channel $\bar{H}=\Sigma_{t=1}^{T}H_tH_t^*$, $\oplus$ is the Kronecker summation operator, and $\Phi$ is a T×T covariance matrix of the interference across the T number of resource elements at one receiver antenna, i.e. $\Phi[m,n]=R_{WW}[R(m-1)+1, R(n-1)+1]$.

According to yet another embodiment of the method, the step of equalizing involves for m=1:M, where M is the number of detectors:

taking elements (m−1)L+1:mL of the filtered resource elements y;

feeding the elements (m−1)L+1:mL to the detector.

According to this embodiment, L>1.

According to yet another embodiment of the method, the number of detectors is M=PT/L, where P is the number of transmit antennas.

According to yet another embodiment of the method, the at least one detector is a near optimum detector for the linear Gaussian vector channel, such as a ML detector, a MAP detector, or an M-detector.

According to yet another embodiment of the method, said plurality of resource elements are allocated in one or more Resource Block, RB, pairs.

According to yet another embodiment of the method, said cellular wireless communication system, such as 3GPP communication systems.

According to yet another embodiment of the method, said receiver node is a relay node station or a user node station, such as a User Equipment, UE, and the radio signal is transmitted in the downlink of the wireless communication system.

According to yet another embodiment of the method, the resource elements in the first set carries user data or control data.

The present invention also relates to a computer program, characterized in code means, which when run by processing means causes said processing means to execute the present methods.

According to a second aspect of the invention, the above mentioned and other objectives are achieved with receiver device of a cellular wireless communication system, said receiver device being arranged to receive radio signals; and the cellular wireless communication system using time/frequency resource elements for transmission of radio signals over a Multiple Input Multiple Output, MIMO, radio channel, and the radio signals comprising different channels and/or pilot symbols; the receiver comprising a processor arranged to:

a) receive at least one radio signal comprising a plurality of resource elements;

b) obtain interference information associated with the plurality of resource elements;

c) extract resource elements from the plurality of resource elements carrying data into a first set based on the interference information so that the first set comprises resource elements carrying data and being affected by interference;

d) divide the resource elements in the first set into one or more sub-sets each comprising T number of resource elements;

e) filter the resource elements in said one or more sub-sets by applying a balanced whitening and energy focusing filter W so as to obtain filtered resource elements y; and f) equalize the filtered resource elements y by applying at least one detector arranged to handle L MIMO layers.

According to an embodiment of the receiver device, said receiver device is a relay node station or a user node station, such as a User Equipment, UE.

The present invention provides a solution which allows the use of near optimum detector in a receiver node which therefore is capable of implicitly cancel the dominant CRS interference(s), e.g., in HetNet scenarios. This will improve the performance of detection.

Furthermore, in case of more than one interfering cell the proposed method does not require successive estimation and cancellation of each interfering cell and thus, the implementation complexity and latency can be kept low with the present invention.

Moreover, a scalable robust detector is proposed which offer a good trade-off between performance and implementation complexity. Scalability is based on the size of the resource element sub-set size and the dimensions of the detector algorithm which can be chosen.

Further applications and advantages of the invention will be apparent from the following detailed description.

BRIEF DESCRIPTION OF THE DRAWINGS

The appended drawings are intended to clarify and explain different embodiments of the present invention in which.

DETAILED DESCRIPTION OF THE INVENTION

Figure 1:
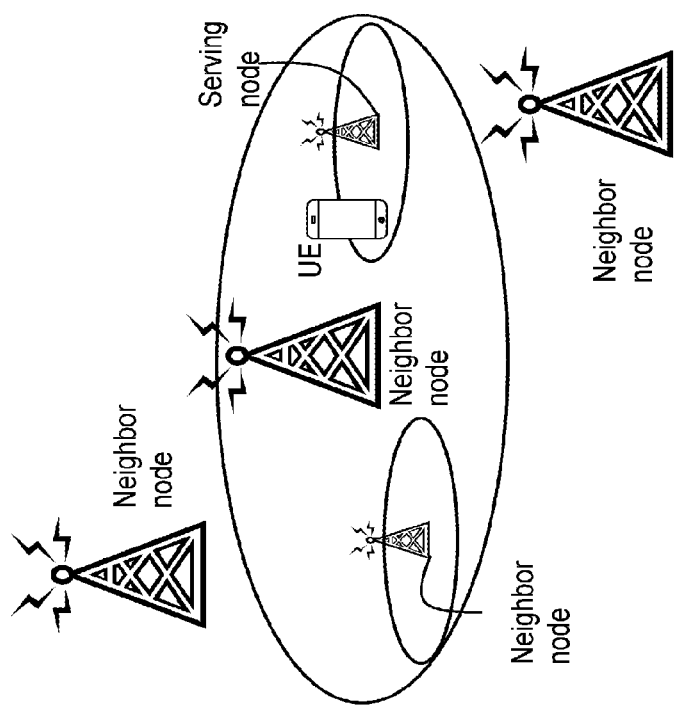
FIG. 1 illustrates heterogeneous networks, HetNet.

The RBE equalizing method is good in the sense that it can adequately address the color of the interference. However, since the subsequent detection step is carried out by a single symbol MMSE detector, the pre-filtering cannot fully whiten the interference. This is so since full whitening would render too much off dependencies among the data symbols, a situation which the single symbol MMSE detector is not capable of dealing with. In brief, the present invention proposes a method that filters the signal in a way such that the interference is much whiter (loosely speaking) that what is possible with the RBE. The created, but controlled, dependencies among the data symbols are then dealt with by a group-wise near optimum detector with a complexity that can be designed.

The present method therefore relates to an equalizing method in a receiver node arranged for receiving radio signals and processing them in a suitable fashion. The cellular wireless communication system uses time/frequency resource elements for transmission of radio signals over a Multiple Input Multiple Output (MIMO) radio channel. The radio signals comprise different channels and/or pilot symbols, and examples of such systems are LTE, LTE Advanced, etc. The basic method comprises the steps of:

a) receiving at least one radio signal comprising a plurality of resource elements;

b) obtaining interference information associated with the plurality of resource elements;

c) extracting resource elements from the plurality of resource elements carrying data into a first set based on the interference information so that the first set comprises resource elements carrying data and being affected by interference, which means that it is the non-colliding scenario described above;

d) dividing the resource elements in the first set into one or more sub-sets each comprising T number of resource elements—the rationale behind forming these sub-sets is that the receiver node will exploit the fact that interference is correlated in the sub-sets. The larger the size T, the better the performance. In the case of T=1, then there is only per-RE processing, and no gains can be obtained;

e) filtering the resource elements in the one or more sub-sets by applying a balanced whitening and energy focusing filter W so as to obtain filtered resource elements y; and f) equalizing the filtered resource elements y by applying at least one detector arranged to handle L MIMO layers—typically, there is already a detector implemented in the chipset of the receiver so in that case L will automatically be specified. If the chipset is designed so that it can support 4×4 MIMO, then L=4. The choice of L also specifies the number of sub-sets which becomes M=PT/L, where we remind the reader that P denotes the number of transmit antennas. In the case of PT/L not evaluating to an integer, special arrangements have to be done. Since a detector designed for L layers can typically handle also <L layers, we propose to use $\lfloor PT/L \rfloor$ sub-sets of size L and one sub-set of size $PT-L\lfloor PT/L \rfloor$.

The detector algorithm used in the present invention is any detector algorithm that synthesizes a near optimal detector of a linear Gaussian vector channel of the form y=Hx+n, where H is any L×L matrix, x is a L×1 vector of data symbols, and n is white Gaussian noise. Further, the detector algorithm can either be of soft-input or hard input type, meaning that in the former case, the outputted values from the detector belongs to the same constellation that x does, and in the latter case that probabilities of what x may be is outputted. The detector algorithm can also accept soft-input of the data symbols x. Examples of detector algorithms are: ML detection, MAP detection, the M-algorithm, etc.

The present invention therefore provides a much improved RBE algorithm allowing the use of near optimal detectors instead of MMSE which means that the performance is substantially increased. Moreover, the complexity can also be designed according to the present invention thereby providing flexibility.

Figure 2:
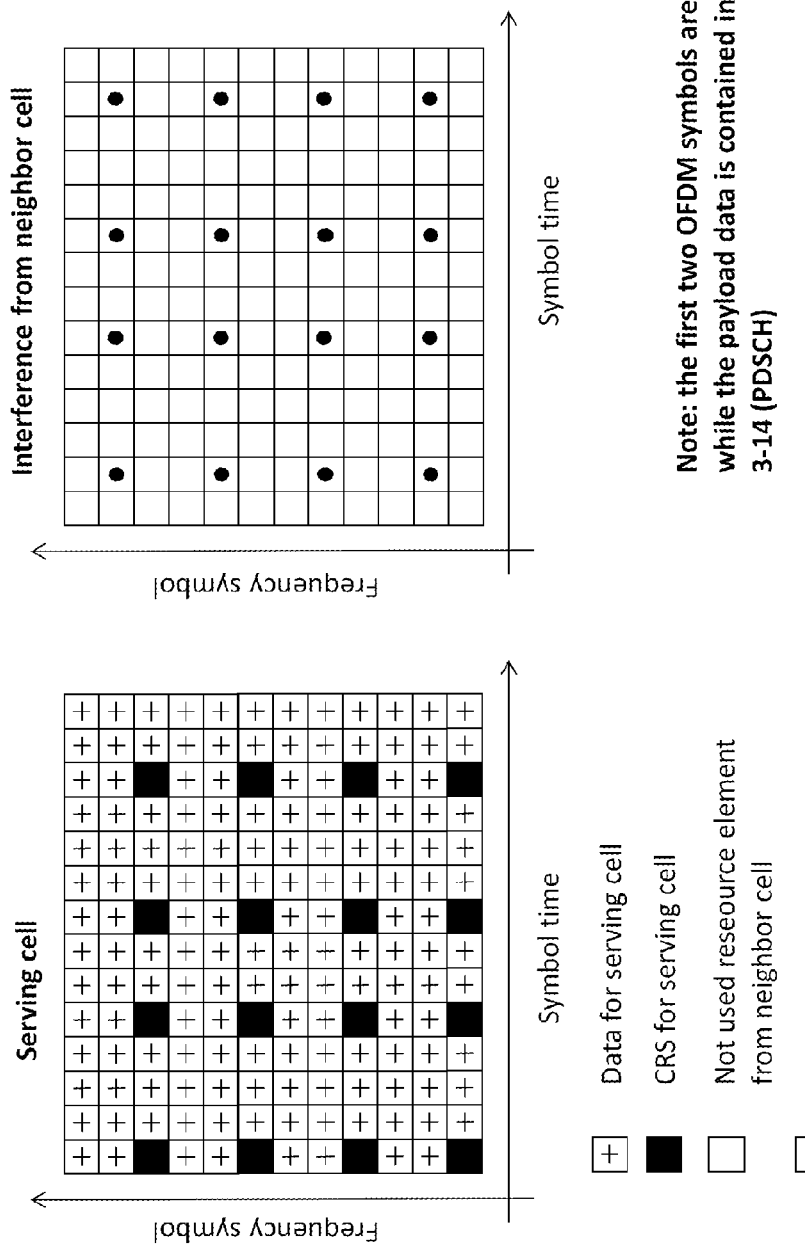
FIG. 2 illustrates the RE allocation in one RB pair in left and extracted REs in right.

As mentioned above the present invention is applicable to the non-colliding scenarios. In case of a HetNet with non-colliding CRS, the CRS interferences from neighbor cells are colliding with the control/data channels of the downlink signal from serving cell. FIG. 2 (left) illustrates the LTE MIMO RE allocation within one resource block (RB) pair in a non-colliding CRS scenario. The CRS interferences (right part of FIG. 2) are located in certain REs in OFDM symbols carrying CRS from serving cell and colliding with control and data channels.

The activation of non-colliding CRS interference cancellation can e.g., be based on the fact that a non-colliding CRS scenario is detected, i.e., the resource elements in the first set carries user data or control data. This can be easily identified by the cell-ID of neighbor cell(s). In view of FIG. 2, non-colliding means that the REs marked with dots (neighbor CRS) in the right part do not overlap with the black REs (serving cell CRS) in the left part. Whether the CRS is colliding or not can be identified when a receiver node receives the ABS macro-cell pattern information from higher layers of the system.

Figure 3:
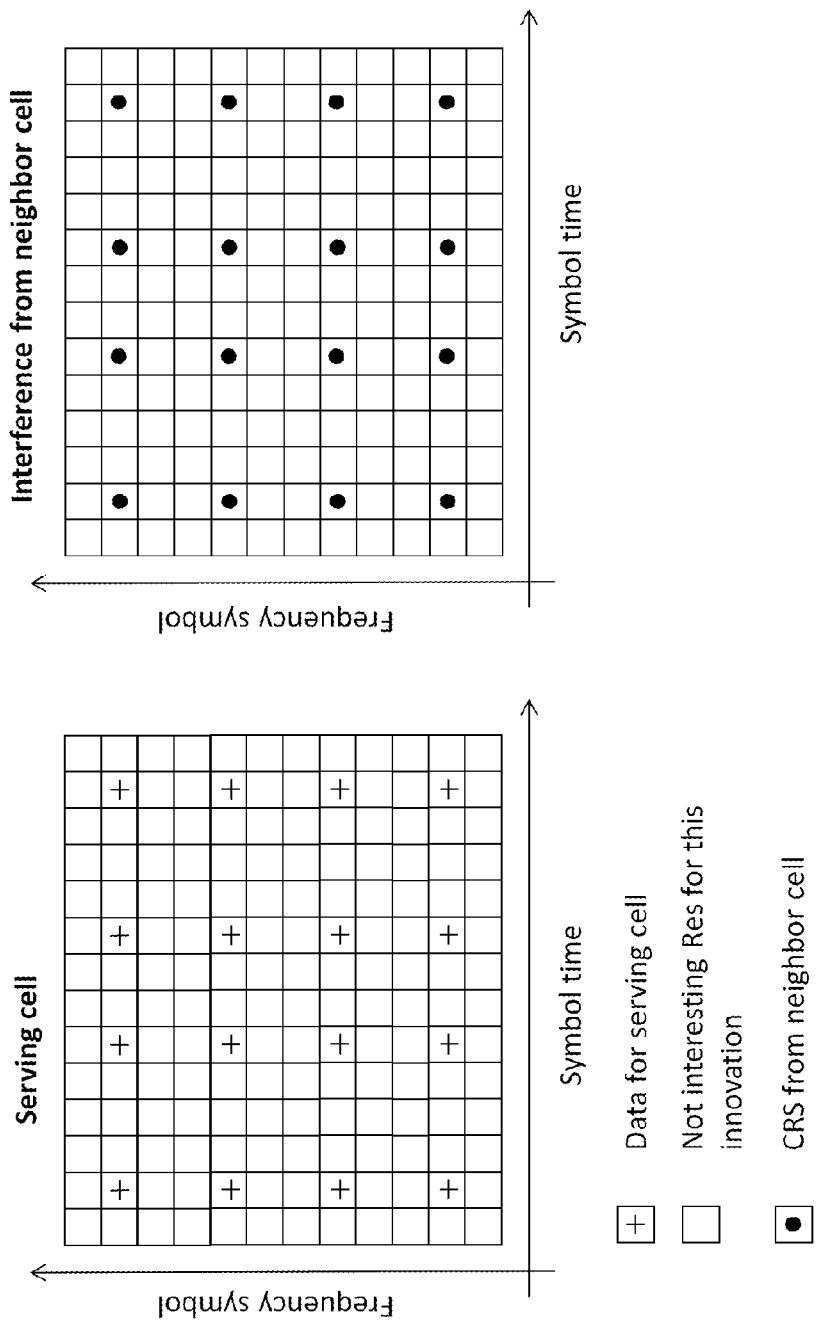
FIG. 3 illustrates RE extracted according to the invention.

The present method needs to separate the data demodulation between the REs that are interfered with (i.e., the REs marked with "+" where REs marked with dots overlap) and the REs that are not interfered with (i.e., the rest of the REs marked with "+"). The present method applies only to the REs that are interfered with. The next step is to isolate the REs of interest for the present algorithm. This is illustrated in FIG. 3, in the left part of the figure, only the REs marked with "+" are of interest to us as the blank REs can be detected by standard methods since there is no interference present at these REs (due to the ABS transmission mode).

Once the detection algorithm is activated, it will require the measured power and delay of interfering cell(s), i.e., interference information associated with the plurality of the REs such that the interference information indicates the time/frequency location of the resource elements of the first set. These parameters can be obtained from other measurement units (which are quite common in LTE e.g.: RSRP measurement block).

Thereafter, the size T of the RE sub-set T must be determined, and is according to an embodiment based/dependent on the channel coherence bandwidth and coherence time. For example, an UE is typically equipped with channel parameters estimation which provides such information. In a large coherence bandwidth and time, a large RE sub-set size T is expected to further improve the performance with the cost of implementation complexity, and vice versa. The rationale behind this performance increase with T is that the interference is heavily correlated over the T REs and by a pre-filtering of the signals across the T REs, the interference and the signal parts can be separated. However, it is also realized that the sub-set size can be predetermined or fixed. The advantage with predetermined or fixed sub-set size is that the complexity of implementing the present algorithm is reduced. The drawback in comparison with an adaptive algorithm is that the performance is reduced.

Figure 4:
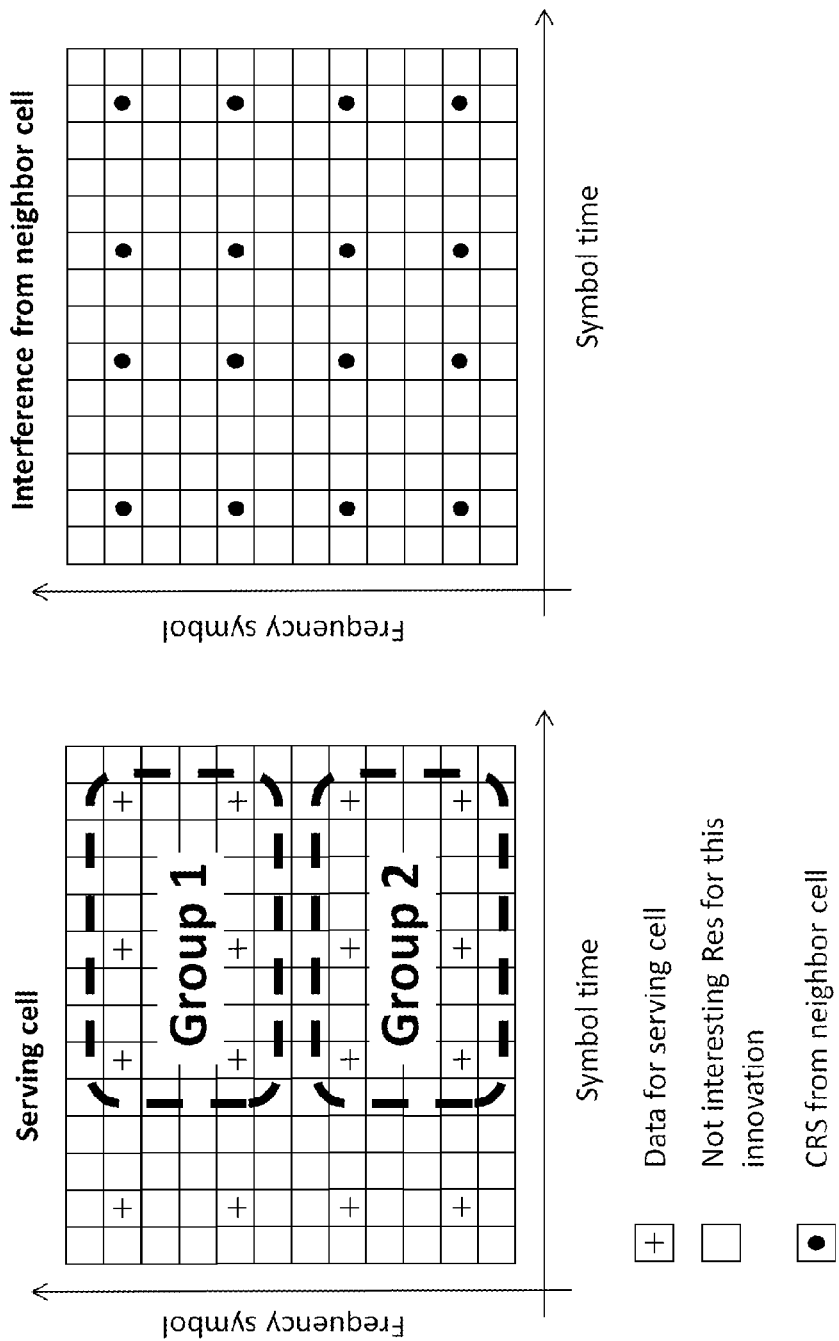
FIG. 4 illustrates the choice of the sub-set size.

A particular choice for grouping the interfered REs is shown in FIG. 4. In this case the sub-set size is T=6. The upper sub-set 1 will be treated separately from sub-set 2. Better performance will be obtained if group 1 and group 2 were merged into a single sub-set, at the expense of complexity.

Furthermore, in the following disclosure an in-depth description of the theory and mathematical models behind the invention is presented together with preferred embodiments. It should be noted that throughout this disclosure a boldface lowercase letter denotes a vector valued variable, and a boldface uppercase letter denotes a matrix valued variable, and further the symbol "*" denotes the Hermitian transpose operator.

The channel model for the received signal for RE t is in this case, $$y_t = H_t x_t + \sum_{k=1}^{K} I_t^k p_t^k + n_t$$

where $y_t$ is the received R×1 vector, $H_t$ is the R×P channel matrix which is assumed to be known, $x_t$ is the P×1 data vector to be estimated, $I_t^k$ is the channel matrix of the kth neighbor cell, $p_t^k$ is the CRS vector of the kth neighbor cell, and $n_t$ is thermal noise.

Although the interfering cell channel matrices $\{I_t^k\}_{t=1}^T$ are unknown, they are heavily correlated according to an assumed model. We assume that two channels from different cells are independent so there is no correlation over the index k. A natural choice is to assume the same second order statistics as for the serving cell channel model. If we assume spatially uncorrelated channels, we get, $$R_{ts}^k \equiv E[(p_t^k)^*(I_t^k)^* I_s^k p_s^k] = \gamma_{ts}^k Tr((p_t^k)^* p_s^k) I. \quad \text{(Eq. 1)}$$

From the initial measurement units, the values of $p_t^k$ and $\gamma_{ts}^k$ would be known. If we include all the K neighbor cells, and use that assumption that these are assumed independent, we obtain a correlation model for the interference which reads, $$\bar{R}_{ts} = \sum_{k=1}^{K} R_{ts}^k.$$

Let us now stack the received signals at the T REs on top of each other which yields, $$y \equiv \begin{bmatrix} y_1 \\ y_2 \\ \vdots \\ y_T \end{bmatrix} = \begin{bmatrix} H_1 & 0 & \cdots & 0 \\ 0 & H_2 & \ddots & \vdots \\ \vdots & \ddots & \ddots & 0 \\ 0 & \cdots & 0 & H_T \end{bmatrix} \begin{bmatrix} x_1 \\ x_2 \\ \vdots \\ x_T \end{bmatrix} + \begin{bmatrix} w_1 \\ w_2 \\ \vdots \\ w_T \end{bmatrix} \equiv Hx + w, \quad \text{(Eq. 2)}$$

where w is the interference plus noise with the correlation model, $$E[ww^*] = R_{ww} \equiv \begin{bmatrix} \bar{R}_{11} + N_0 I & \bar{R}_{12} & \cdots & \bar{R}_{1T} \\ \bar{R}_{21} & \bar{R}_{22} + N_0 I & \ddots & \vdots \\ \vdots & \ddots & \ddots & \bar{R}_{T-1,T} \\ \bar{R}_{T1} & \cdots & \bar{R}_{T,T-1} & \bar{R}_{TT} + N_0 I \end{bmatrix}. \quad \text{(Eq. 3)}$$

From the last equation, it is straightforward to obtain the optimal detector, i.e., the maximum likelihood (ML) detector. The first step would be to whiten the noise w by a whitening filter, $$r = R_{ww}^{-1/2} y = Gx + \tilde{w}.$$

Now, $\tilde{w}$ is white. However, such whitening process would destroy the block diagonal structure of the channel matrix G, which will now become, $$G \equiv \begin{bmatrix} G_{11} & 0 & \cdots & 0 \\ G_{21} & G_{22} & \ddots & \vdots \\ \vdots & \ddots & \ddots & 0 \\ G_{T1} & \cdots & G_{T,T-1} & G_{TT} \end{bmatrix}.$$

Thus, the ML detection complexity will be $O(\Omega^{PT})$, where $\Omega$ is the cardinality of the input constellation. The RBE, on the other hand, obtains a detection complexity of PTO($\Omega$) by applying the MMSE filter, $$\hat{x} = H^*(HH^* + R_{WW})^{-1} y \approx Dx + \tilde{w}$$

where D is a diagonal matrix.

These two cases, i.e., ML and MMSE detectors are two extremes, both in terms of performance and complexity, and we next describe how to reach solutions in between mentioned detector types. The complexity of the present invention is $(PT/L)O(\Omega^L)$ where L can be interpreted as a design parameter. Our objective is to construct a filter W such that we obtain, $$Wy = r = \begin{bmatrix} r_1 \\ r_2 \\ \vdots \\ r_{PT/L} \end{bmatrix} \approx \begin{bmatrix} G_1 & 0 & \cdots & 0 \\ 0 & G_2 & \ddots & \vdots \\ \vdots & \ddots & \ddots & 0 \\ 0 & \cdots & 0 & G_{PT/L} \end{bmatrix} \begin{bmatrix} \tilde{x}_1 \\ \tilde{x}_2 \\ \vdots \\ \tilde{x}_{PT/L} \end{bmatrix} + \begin{bmatrix} w_1 \\ w_2 \\ \vdots \\ w_{PT/L} \end{bmatrix}. \quad \text{(Eq. 4)}$$

Here, the matrix $G_m$ is a virtual MIMO matrix of dimension L×L, and $\tilde{x}_m$ is an L×1 vector comprising data symbols. The noise vector is not white. Note that there may very well be leakage from $\tilde{x}_m$ to $r_n$, n≠m, but such leakage is modeled in the noise $w_n$.

Two questions arise: how to find W, and for a given W, how to find the virtual matrices $G_m$. This is now solved under the following two assumptions: (i) independent complex Gaussian inputs x, and (ii) a mutual information cost function.

Start by constructing the matrix, $$B = I - H^*(HH^* + R_{ww})^{-1} H \quad \text{(Eq. 5)},$$

and define, $$\lambda(k) = L - 1 - ((k-1) \bmod L). \quad \text{(Eq. 6)}$$

Now, make the definitions, $$\bar{B}_k = \begin{bmatrix} B_{k+1,k+1} & \cdots & B_{k+1,\min(PT,k+\lambda(k))} \\ \vdots & \ddots & \vdots \\ B_{\min(PT,k+\lambda(k)),k+1} & \cdots & B_{\min(PT,k+\lambda(k)),\min(PT,k+\lambda(k))} \end{bmatrix}, \quad \text{(Eq. 7)}$$

$$1 \le k \le PT$$

and

-continued $$\bar{b}_k = [B_{k,k+1} \ldots B_{k,\min(PT,k+\lambda(k))}], 1 \le k \le PT, \quad \text{(Eq. 8)}$$

$$c_k = B_{kk} - \bar{b}_k \bar{B}_k^{-1} \bar{b}_k^*, 1 \le k \le PT. \quad \text{(Eq. 9)}$$

Construct an upper triangular matrix U where the values at the kth row are, $$[\underbrace{0 \ldots 0}_{k-1 \text{ zeros}} c_k^{-1/2} \; c_k^{-1/2} \bar{b}_k \bar{B}_k^{-1} \; \underbrace{000 \ldots 00}_{\text{pad to length } PT}] \quad \text{(Eq. 10)}$$

Given U, construct a matrix $\Gamma$ as, $\Gamma \equiv UU^* - I$ and G as the Cholesky decomposition of $\Gamma$, i.e., $\Gamma = G^*G$ The matrix G is the channel matrix in Eq. (4), i.e., it is block-diagonal and contain $\{G_k\}_{k=1}^{PT/L}$ along its main diagonal.

The matrix W in Eq. (1) is constructed as, $$W = (G^*)^{-1}(\Gamma + I)H^*(HH^* + R_{ww})^{-1} \quad \text{(Eq. 11)}$$

Hence, it is observed that the filter is dependent on L and also on the interference information. More precisely, the value L specifies the structure of the matrix G, while the interference information determines the covariance matrix $R_{WW}$.

According to a preferred embodiment of the invention the method involves:

1. Estimate the radio channel parameters needed, i.e.:
   a. The noise density at the receiver node.
   b. The serving cell channel type and channel strength.
   c. Number of neighbor cells.
   d. Whether the neighbor cells are transmitting ABS frames or not.
   e. Are the neighbor cells' CRS colliding with the serving cell pilots or not.
   f. From the cell-search procedure, find the CRS signals of the neighbor cells.
2. If the following outcomes of 1c-1e all hold true, i.e.:
   1.c: is at least one neighbor cell.
   1.d: ABS frames are transmitted.
   1.e: they are not colliding, i.e., the non-colliding case.
   Then, activate the method in this invention, and move on to step 3.
3. Estimate the channel of the serving cell. This is a standard procedure, and can be facilitated by standard means as the serving cell CRS is not interfered with.
4. Assume that the neighbor cell obey the same correlation model as the serving cell channel. This correlation model is estimated in (the first part of) 1.b.
5. Determine system parameters (up to the user to decide) for the detector(s), i.e., the sub-set size T, and the dimension L of the detector algorithm to be used.
6. Extract the interfered REs and stack them in a vector y according to Eq. (2).
7. Compute the correlation of the noise plus interference $R_{ww}$ according to Eq. (1) and Eq. (3). This step requires the input of 1.c, 1.f and 4.
8. Follow the procedure in Eq. (3) to Eq. (10) to find the virtual block diagonal channel matrix G that comprises $\{G_k\}_{k=1}^{PT/L}$ along its main diagonal and zeros elsewhere.
9. Compute the filter matrix W according to Eq. (11).
10. Construct the vector r in Eq. (4) as r=Wy.
11. Express the PT×1 vector r as $r=[r_1' \; r_2' \ldots r_{PT/L}']'$, where x' denotes the transpose of x. Each sub-vector $r_k$ is now an L×1 vector.
12. Apply the detector algorithms to all the vectors $\{r_k\}_{k=1}^{PT/L}$. This yields estimated symbol vectors $\{\hat{x}_k\}_{k=1}^{PT/L}$, or soft information thereof.
13. Stack the estimated symbol vectors $\{\hat{x}_k\}_{k=1}^{PT/L}$ in a PT×1 vector $\hat{x}$ and output the symbols in this vector as the detected symbols at the T REs. In the case of a soft-output detector in step 12, the vector $\hat{x}$ comprises soft values, typically in the form of LLRs.

Figure 5:
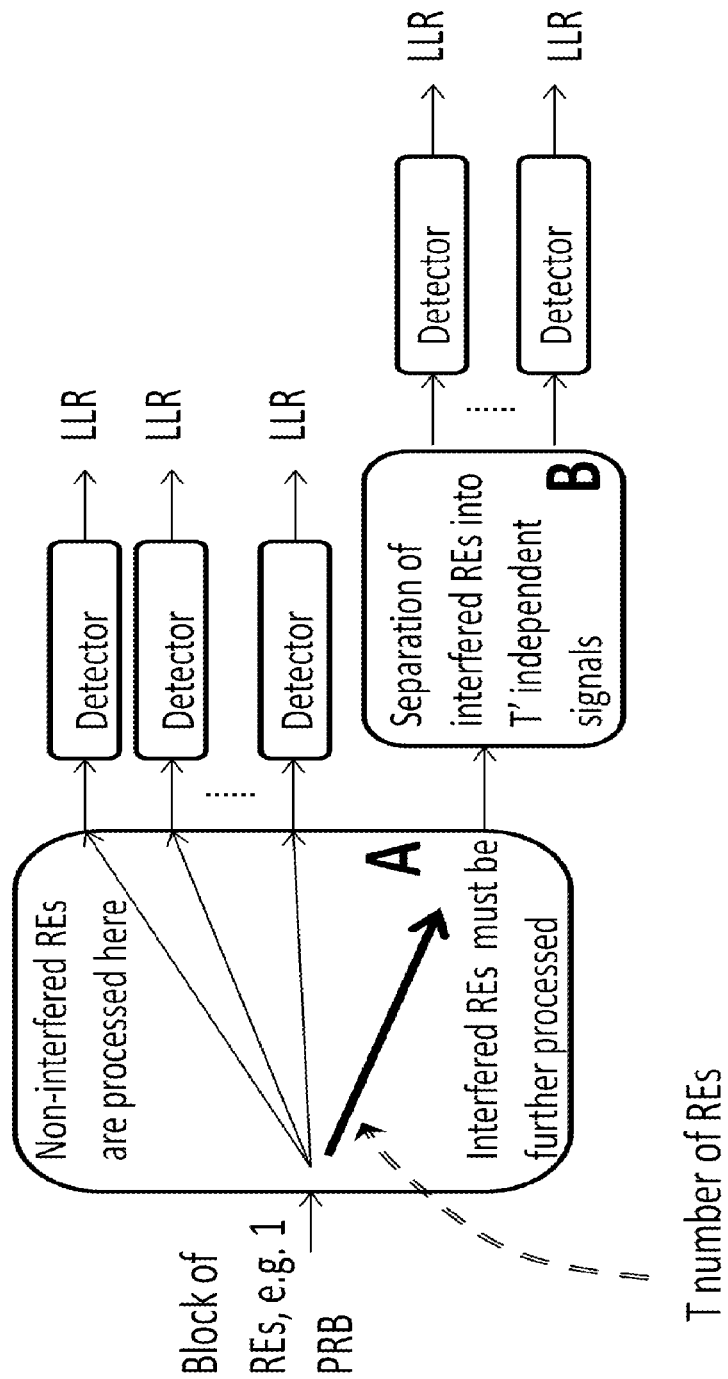
FIG. 5 shows a block diagram of an embodiment of the present invention.
Figure 6:
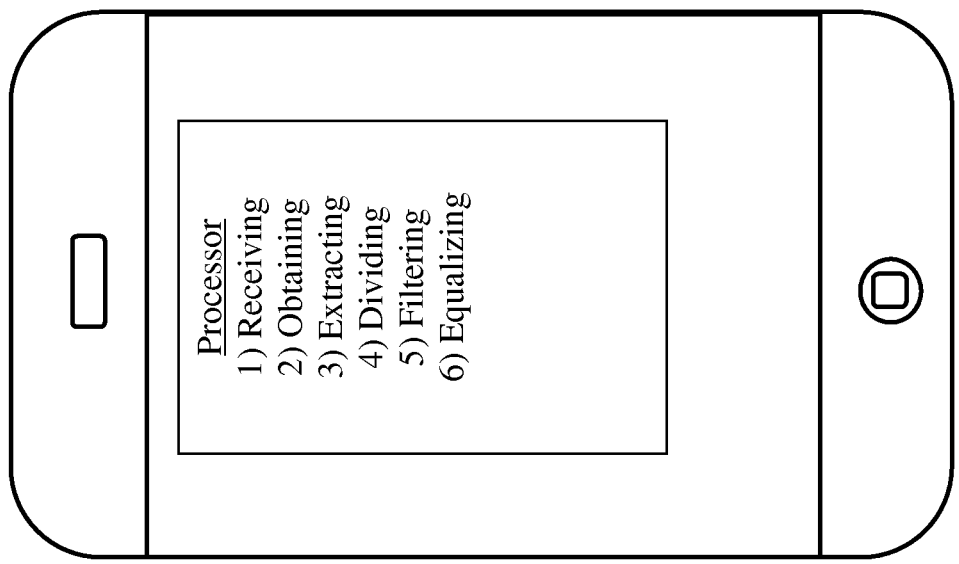
FIG. 6 illustrates an embodiment of a receiver device according to the invention.

A block diagram of this embodiment is shown in FIG. 5. Steps 1-6 are carried out in the box labeled A, while steps 7-11 are carried out in the box labeled B. Steps 12-13 are carried out in the detector(s) boxes coupled to box B.

The present invention further provides a solution for complexity reduction of the matrix inverse $(HH^* + R_{ww})$ needed in Eq. (11). The main computational complexity lies in the PT×PT matrix inversion of needed in Eq. (11). We propose a complexity reduction that assumes the serving cell channel to be almost constant across the group. This yields P T×T matrix inversions instead of one PT×PT matrix inverse. This reduces the computational cost by a factor of $P^2$.

We need to invert a matrix of the form $(HH^* + R_{ww})$ where HH* is block-diagonal. From inspection of Eq. (1) and Eq. (3) it can be seen that $R_{ww}$ has the form $R = \Phi \otimes I$ where I is the identity matrix of size T×T, $\Phi$ can be read of from Eq. (3), and $\otimes$ denotes the Kronecker product. We now assume that the block-diagonal matrix H contains the same block along its main diagonal. This assumption is justified in practice if the Doppler spread of the terminal is slow, so that the channel is quasi-constant across the group size T. The larger the group size, the less accurate this assumption becomes. But for group sizes within one PRB the assumption is not too strong. Further, if the channel matrices cannot be said to be constant, one can base the matrix inverse upon a block diagonal matrix, where each block equals the "average matrix": $\bar{H} = \Sigma_{t=1}^{T} H_t H_t^*$.

We can now write the inverse as, $$(HH^* + R_{ww})^{-1} = (U\Sigma U^* + UU^* R_{ww} UU^*)^{-1}$$

where $U\Sigma U^*$ is the SVD of HH*. Due to the assumption of the same block along the diagonal of H, the diagonal matrix $\Sigma$ contains T replicas of P distinct numbers. It is also important to note that $\Sigma$ is sorted along its diagonal. Given these structures of HH* and $R_{ww}$ we directly obtain:

$$U^* R_{ww} U = \begin{bmatrix} \Phi & 0 & \cdots & 0 \\ 0 & \Phi & \ddots & \vdots \\ \vdots & \ddots & \ddots & 0 \\ 0 & \cdots & 0 & \Phi \end{bmatrix} = I \otimes \Phi$$

$$\Sigma = \begin{bmatrix} \lambda_1 & 0 & \cdots & 0 \\ 0 & \lambda_2 & \ddots & \vdots \\ \vdots & \ddots & \ddots & 0 \\ 0 & \cdots & 0 & \lambda_M \end{bmatrix} \otimes I = \Lambda \otimes I$$

where $\Lambda$ is a P×P diagonal matrix with the singular values of one of the diagonal blocks in HH*. We get $\Sigma + U^* R_{ww}$, $U = \Lambda \oplus \Phi$ where $\oplus$ is the Kronecker summation operator. This is a block diagonal matrix where each block is of size T×T, and there is P such blocks. Note that only the main diagonals of the blocks differ. This gives us, $$(HH^*+R_{ww})^{-1}=(U\Sigma U^*+UU^*R_{ww}UU^*)^{-1}=U[\Lambda\oplus\Phi]^{-1}U^*$$

Hence according to an embodiment of the invention the computation of the inverse involves the following steps:
1. Establish the matrix $\Phi$ from the assumed correlation model. This can be read out directly from Eq. (3);
2. Compute the SVD of the P×P matrix $\bar{H}$ (here $\bar{H}$ denotes the average channel matrix, but if all channel matrices at the REs of interest are the same, one can pick any of them), denote the singular values by $\Lambda$, and the unitary matrix by $U_1$. These are both P×P matrices;
3. Form U, as a PT×PT block diagonal matrix where the block all equal $U_1$;
4. Form the Kronecker summation [$\Lambda\oplus\Phi$] This is a block diagonal matrix, with P block, each of dimension T×T. The P blocks are all distinct;
5. Invert [$\Lambda\oplus\Phi$.] This requires P T×T matrix inverses; and
6. Form the desired matrix inverse as $(HH^*+R_{ww})^{-1}=U[\Lambda\oplus\Phi]^{-1}U^*$ Moreover, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Furthermore, the present method can be implemented and executed in suitable receiver devices. It is realized by the skilled person that the present receiver device may comprise the necessary communication capabilities in the form of e.g., functions, means, units, elements, etc., for executing the methods according to the invention which means that the devices can be modified, mutatis mutandis, according to any method of the present invention. Examples of other such means, units, elements and functions are: memory, encoders, decoders, mapping units, multipliers, interleavers, deinterleavers, modulators, demodulators, inputs, outputs, antennas, amplifiers, DSPs, etc. which are suitably arranged together.

Especially, the processors of the present receiver device may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Figure 7:
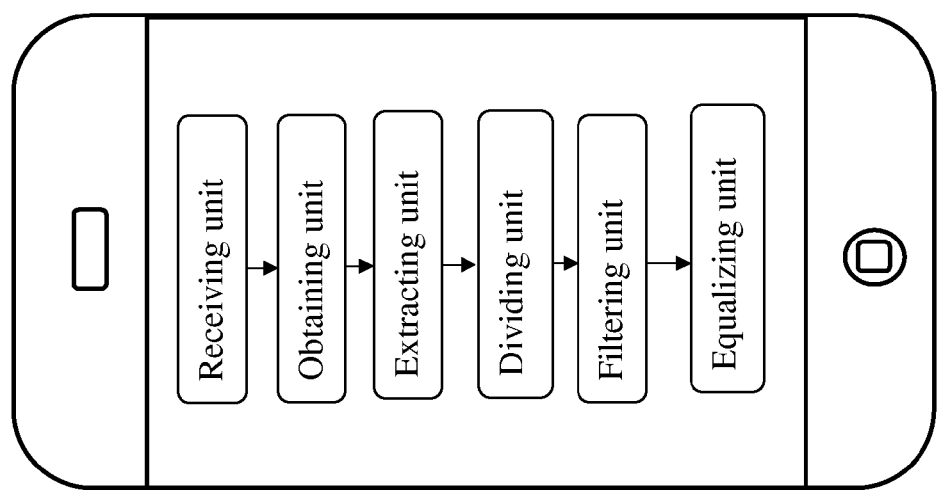
FIG. 7 illustrates an alternative embodiment of a receiver device according to the invention.

The present receiver device comprises a processor which is arranged to: receive at least one radio signal comprising a plurality of resource elements; obtain interference information associated with the plurality of resource elements; extract resource elements from the plurality of resource elements carrying data into a first set based on the interference information so that the first set comprises resource elements carrying data and being affected by interference; divide the resource elements in the first set into one or more sub-sets each comprising T number of resource elements; filter the resource elements in said one or more sub-sets by applying a balanced whitening and energy focusing filter W so as to obtain filtered resource elements y; and equalize the filtered resource elements y by applying at least one detector arranged to handle L MIMO layers. This embodiment is illustrated in FIG. 7 in which the receiver comprises a processor arranged for executing the different steps of the present method.

A receiver device or node may be any suitable user communication device/node arranged for communication in a wireless communication system, preferably a relay station or a user node station. Examples of a user node station is a mobile communication device, an actuator device, a mobile phone, a portable computer (laptop), a stationary computer, a sensor device, a device for machine-type communication, a device for machine-to-machine communication, etc.

Alternatively, according to another embodiment of the invention the present receiver device comprises a receiver unit, interference information unit, extracting unit, dividing unit, filtering unit, equalizing unit. The receiver device is arranged such that: the receiver unit is arranged to receive at least one radio signal comprising a plurality of resource elements; the interference information unit is arranged to obtain interference information associated with the plurality of resource elements; the extracting unit is arranged to extract resource elements from the plurality of resource elements carrying data into a first set based on the interference information so that the first set comprises resource elements carrying data and being affected by interference; the dividing unit is arranged to divide the resource elements in the first set into one or more sub-sets each comprising T number of resource elements; the filtering unit is arranged to filter the resource elements in said one or more sub-sets by applying a balanced whitening and energy focusing filter W so as to obtain filtered resource elements y; and the equalizing unit is arranged to equalize the filtered resource elements y by applying at least one detector arranged to handle L MIMO layers. This embodiment is illustrated in FIG. 8 in which the receiver comprises dedicated units for the corresponding method steps.

The present cellular system in which the present method may be used is a 3GPP system, such as LTE or LTE Advanced, or any other suitable cellular system, which is well understood by the skilled person.

Finally, it should be understood that the present invention is not limited to the embodiments described above, but also relates to and incorporates all embodiments within the scope of the appended independent claims.

The invention claimed is:
1. Equalizing method in a receiver of a cellular wireless communication system, the method comprising:
   receiving at least one radio signal comprising a plurality of resource elements;
   obtaining interference information associated with the plurality of resource elements;
   extracting resource elements from the plurality of resource elements carrying data into a set based on the interference information, the set including resource elements affected by interference from among resource elements of the plurality of resource elements unaffected by interference;
   dividing the resource elements in the set into one or more sub-sets comprising T number of resource elements, the one or more sub-sets being formed to correlate with interference;

filtering the resource elements in said one or more subsets using a balanced whitening and energy focusing filter W and obtaining filtered resource elements y; and equalizing the filtered resource elements y using at least one detector configured to handle L Multiple Input Multiple Output (MIMO) layers in the receiver of the cellular wireless communication system from among the plurality of resource elements including the resource elements unaffected by interference which are comprised in radio signals of different channels and pilot symbols received over a MIMO radio channel, the at least one detector performs the equalizing of the filtered resource elements y.

2. Method according to claim 1, wherein the interference information indicates time/frequency location of the resource elements of the set.

3. Method according to claim 1, wherein said receiver is served by a serving cell, and the interference information comprises information about Almost Blank Sub-frame, ABS, transmissions from one or more interfering cells.

4. Method according to claim 1, wherein the sub-set size T is based on the channel conditions for the radio channel, is predetermined, or fixed.

5. Method according to claim 4, wherein the channel conditions are coherence bandwidth and coherence time for the radio channel.

6. Method according to claim 5, wherein a value for the sub-set size T is increased with increasing coherence bandwidth and coherence time; and the value for the sub-set size T is decreased with decreasing coherence bandwidth and coherence time.

7. Method according to claim 1, wherein the filter W is dependent on L.

8. Method according to claim 7, wherein the filter W has the form:

$$W=(G^*)^{-1}(\Gamma+I)H^*(HH^*+R_{WW})^{-1},$$

where G is the virtual MIMO matrix having dimension L×L, $\Gamma$ equals $\Gamma=G^*G+I$, I is the identity matrix, H is the channel matrix of all T resource elements, and $R_{WW}$ is the covariance matrix of the interference across the T number of resource elements.

9. Method according to claim 8, wherein $(HH^*+R_{WW})^{-1}=U[\Lambda \oplus \Phi]^{-1}U^*$, where U is the left unitary matrix of the singular value decomposition of HH*, where $\Lambda$ is the eigenvalues of the average channel $\bar{H}=\Sigma_{t=1}^{T}H_tH_t^*$, $\oplus$ is the Kronecker summation operator, and $\Phi$ is a T×T covariance matrix of the interference across the T number of resource elements at one receiver antenna, $\Phi[m,n]=R_{WW}[R(m-1)+1,R(n-1)+1]$, where R is the number of receiver antennas at said receiver.

10. Method according to claim 1, wherein the stop of equalizing involves for m=1:M, where is the number of detectors:

taking elements (m−1)L+1:mL of the filtered resource elements y;

feeding the elements (m−1)L+1:mL to the detector.

11. Method according to claim 10, wherein L>1.

12. Method according to claim 11, wherein the number of detectors is M=PT/L, where P is the number of transmit antennas and T is the sub-set size.

13. Method according to claim 1, wherein the at least one detector is a near optimum detector for the linear Gaussian vector channel.

14. Method according to any of the preceding claims, wherein said plurality of resource elements are allocated in one or more Resource Block (RB) pairs.

15. Non-transitory computer readable medium having computer executable instructions, the instructions enabling a receiver device of a cellular wireless communication system to receive radio signals, comprising:

receiving at least one radio signal comprising a plurality of resource elements;

obtaining interference information associated with the plurality of resource elements;

extracting resource elements from the plurality of resource elements carrying data into a set based on the interference information, the set including resource elements affected by interference from among resource elements of the plurality of resource elements unaffected by interference;

dividing the resource elements in the set into one or more sub-sets each comprising T number of resource elements, the one or more sub-sets being formed to correlate with interference;

filtering the resource elements in said one or more sub-sets by applying a balanced whitening and energy focusing filter W and obtaining filtered resource elements y; and equalizing the filtered resource elements y using at least one detector configured to handle L MIMO layers in the receiver device of the cellular wireless communication system from among the plurality of resource elements including the resource elements unaffected by interference which are comprised in radio signals of different channels and pilot symbols received over a MIMO radio channel, the at least one detector performs the equalizing of the filtered resource elements y.

16. Receiver device of a cellular wireless communication system, said receiver device being arranged to receive radio signals, the receiver comprising:

a processor arranged to:

receive at least one radio signal comprising a plurality of resource elements;

obtain interference information associated with the plurality of resource elements;

extract resource elements from the plurality of resource elements carrying data into a set based on the interference information, the set including resource elements affected by interference from among resource elements of the plurality of resource elements unaffected by interference;

divide the resource elements in the set into one or more sub-sets each comprising T number of resource elements, the one or more sub-sets being formed to correlate with interference;

filter the resource elements in said one or more sub-sets by applying a balanced whitening and energy focusing filter W and obtaining filtered resource elements y; and equalize the filtered resource elements y using at least one detector configured to handle L MIMO layers the at least one detector being in the receiver device of the cellular wireless communication system from among the plurality of resource elements including the resource elements unaffected by interference which are comprised in radio signals of different channels and pilot symbols received over a MIMO radio channel, the at least one detector performs the equalizing of the filtered resource elements.

* * * * *